US011258677B1

(12) United States Patent
Martin et al.

(10) Patent No.: US 11,258,677 B1
(45) Date of Patent: Feb. 22, 2022

(54) DATA REPRESENTATION GENERATION WITHOUT ACCESS TO CONTENT

(71) Applicant: Amazon Technologies, Inc., Seattle, WA (US)

(72) Inventors: David Paul Martin, Chantilly, VA (US); Sukriti Jain, Great Falls, VA (US); Jean-Paul Stephane Bonny, Falls Church, WA (US)

(73) Assignee: Amazon Technologies, Inc., Seattle, WA (US)

( * ) Notice: Subject to any disclaimer, the term of this patent is extended or adjusted under 35 U.S.C. 154(b) by 69 days.

(21) Appl. No.: 16/586,521

(22) Filed: Sep. 27, 2019

(51) Int. Cl.
*H04L 12/24* (2006.01)
*H04L 41/28* (2022.01)
*H04L 41/046* (2022.01)
*H04L 41/50* (2022.01)
*H04L 41/14* (2022.01)
*H04L 41/12* (2022.01)
*H04L 41/0246* (2022.01)

(52) U.S. Cl.
CPC .......... *H04L 41/28* (2013.01); *H04L 41/0246* (2013.01); *H04L 41/046* (2013.01); *H04L 41/12* (2013.01); *H04L 41/14* (2013.01); *H04L 41/50* (2013.01)

(58) Field of Classification Search
CPC ................. G06F 11/1451; G06F 21/32; G06F 2221/2101; G06F 2201/84; G06F 2212/7207; G07C 9/20; H04L 41/28; H04L 41/0246; H04L 41/046; H04L 41/12; H04L 41/14; H04L 41/50
See application file for complete search history.

(56) References Cited

U.S. PATENT DOCUMENTS

| 10,860,451 | B1* | 12/2020 | Murthy | G06F 11/079 |
| 2006/0026423 | A1* | 2/2006 | Bangerter | H04L 9/3234 |
| | | | | 713/164 |
| 2006/0161750 | A1* | 7/2006 | Perkins | H04L 9/3236 |
| | | | | 711/164 |
| 2008/0189162 | A1* | 8/2008 | Ganong | G08B 25/14 |
| | | | | 705/7.13 |
| 2008/0256595 | A1* | 10/2008 | Schunter | G06F 21/57 |
| | | | | 726/1 |

(Continued)

OTHER PUBLICATIONS

Hinden, et al., "Unique Local IPv6 Unicast Addresses", Network Working Group, Request for Comments: 4193, Oct. 2005, 16 pages.

(Continued)

*Primary Examiner* — Ninos Donabed
(74) *Attorney, Agent, or Firm* — Nicholson De Vos Webster & Elliott LLP

(57) ABSTRACT

Techniques for generating a data representation without access to content are described. A method for generating a data representation without access to content comprises receiving a request to analyze one or more data items in a protected area of the provider network, sending the request to the protected area of the provider network, wherein the cluster model is used to identify a cluster identifier associated with each of the one or more data items, receiving the cluster identifier associated with each of the one or more data items, and regenerating each of the one or more data items based on the cluster identifier.

20 Claims, 10 Drawing Sheets

(56) References Cited

U.S. PATENT DOCUMENTS

| | | | | |
|---|---|---|---|---|
| 2011/0022883 | A1* | 1/2011 | Hansen | G06F 11/2035 |
| | | | | 714/2 |
| 2011/0029494 | A1* | 2/2011 | Blitzer | G06F 11/1458 |
| | | | | 707/694 |
| 2011/0179000 | A1* | 7/2011 | Shaughnessy | G06F 16/2365 |
| | | | | 707/703 |
| 2012/0072989 | A1* | 3/2012 | Sakai | G06F 21/567 |
| | | | | 726/24 |
| 2012/0191663 | A1* | 7/2012 | Blitzer | G06F 11/1458 |
| | | | | 707/679 |
| 2013/0263181 | A1* | 10/2013 | Impollonia | H04N 21/251 |
| | | | | 725/32 |
| 2013/0268400 | A1* | 10/2013 | Ballard | G06F 3/0481 |
| | | | | 705/26.8 |
| 2017/0329747 | A1* | 11/2017 | Noursalehi | G06N 7/005 |
| 2017/0353475 | A1* | 12/2017 | Hutton | G06F 21/56 |
| 2019/0005018 | A1* | 1/2019 | Sharma | G06F 8/70 |
| 2019/0236274 | A1* | 8/2019 | Brenner | G06F 21/566 |
| 2019/0289038 | A1* | 9/2019 | Li | G06N 20/00 |
| 2019/0340540 | A1* | 11/2019 | Xu | G06F 11/3476 |
| 2020/0050778 | A1* | 2/2020 | Lechner | G06F 11/1451 |
| 2020/0349112 | A1* | 11/2020 | Apurva | G06F 16/16 |
| 2020/0371897 | A1* | 11/2020 | Hansmann | G06F 11/3476 |
| 2021/0008448 | A1* | 1/2021 | Kolen | G06N 20/00 |

OTHER PUBLICATIONS

Rekhter, et al., "Address Allocation for Private Internets", Network Working Group, Request for Comments: 1918, Feb. 1996, 9 pages.

* cited by examiner

DATA REPRESENTATION GENERATION WITHOUT ACCESS TO CONTENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Some clients may shift their computing resources from being on-premises and controlled by the user into data centers administered and managed by a data center operator or other service provider. However, different users may have different security requirements, which may limit the number of employees of the provider who are available to view data needed to administer, troubleshoot, and manage computing resources for high security clients.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for generating a data representation without access to content. According to some embodiments, different areas of a provider network may be associated with different security levels. For example, a public area of a provider network may host computing resources (e.g., including data and services) associated with a variety of customers who utilize the services of the provider network, while a protected area of the provider network may also host data and equivalent services but these resources may be air-gapped (e.g., resources that cannot communicate readily with resources in other areas of the provider network). Because access to resources in the protected area is limited, troubleshooting these resources may be difficult. For example, protected areas may only be accessed by certain administrators, engineers, or other employees of the provider network who have sufficient clearance levels to access the protected area. Uncleared users are instead required send requests to cleared users to obtain information about the resources in the protected area (e.g., to troubleshoot the resources, deploy new resources, etc.).

Even when such requests are handled by cleared users, the data the cleared users are viewing may not be removed from the protected area and provided to uncleared users for troubleshooting. For example, log files that were emitted when an error was detected may not be removed, as the log files may include sensitive data in addition to data that is useful for troubleshooting. In some embodiments, the protected area may be restricted from sending any data that can be used to identify content in the protected area. Embodiments enable data that is useful from an engineering perspective to be identified and used without exposing content from the protected area.

In some embodiments, data (such as log files) emitted by services hosted in the public area of the provider network can be analyzed by a data clustering service. The data clustering service can implement a K-means (or other) cluster model to generate K clusters of similar data. The resulting model can then be provided to the protected area of the provider network. When data generated by services in the protected area needs to be analyzed, the data can be analyzed using the model and each individual data item can be assigned a cluster identifier and confidence score. This cluster ID and confidence score can then be returned back to the public area of the provider network and used to regenerate prototypical data that represents the data that was analyzed in the protected area. The confidence score can be used to inform how likely this regenerated data matches the data from the protected area. The regenerated data may then be used to troubleshoot any events that have been detected in the protected area, while ensuring no protected content has been removed from the protected area.

Figure 1:
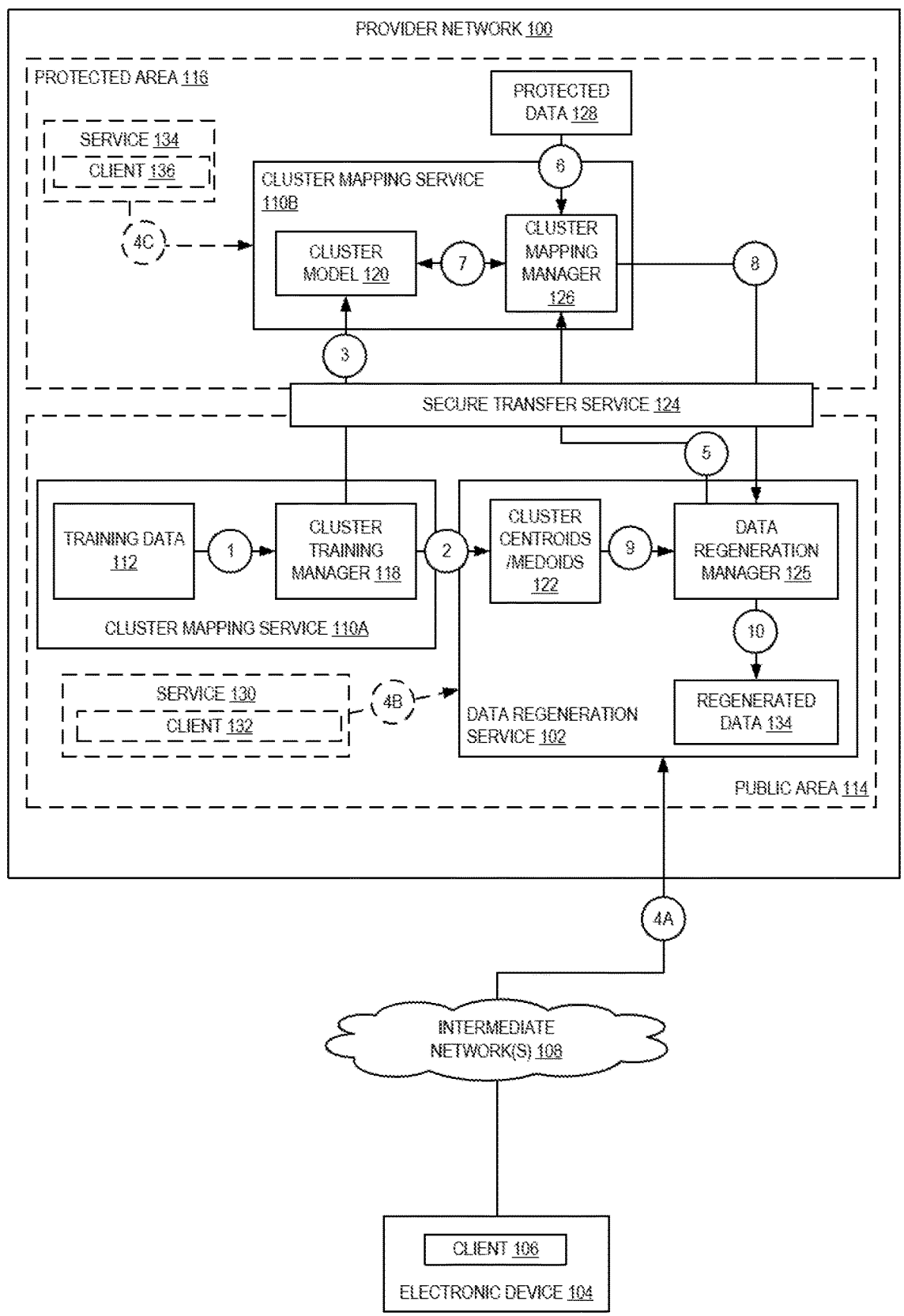
FIG. 1 is a diagram illustrating an environment for generating a data representation without access to content according to some embodiments.

FIG. 1 is a diagram illustrating an environment for generating a data representation without access to content according to some embodiments. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

In some embodiments, the provider network 100 can be optionally subdivided into different areas. For example, as illustrated in FIG. 1, the provider network 100 may be subdivided into a public area 114 and at least one protected area 116. Each area may be logically isolated from the other (and from any other areas not shown within provider network 100. For example, each area may be a distinct logical data center, supported by one or more physical data centers, and each area may have its own power supply and networking infrastructure to limit the likelihood of a failure in one area from affecting another area. In various embodiments provider network 100 may include a plurality of regions, each having its own plurality of areas. In some embodiments, an area of the provider network 100 may represent a region of the provider network. Each region of provider network 100 may include resources located in the same geographic area (e.g., state, country, etc.). By dividing provider network 100 into various regions and areas, the data and customer instances stored therein can be protected against failure events and access to different areas may be separately controlled.

In some embodiments, the public area 114 may be an area within the provider network that provides open access to and interconnectivity among a plurality of entities (users) of the provider network. The protected area 116 may be an area within a private area of the provider network. Access to protected areas of the provider network, and interconnectivity between a protected area and other areas of the provider network (e.g., ability to receive data into and send data from the protected area) may be restricted to certain users of the provider network. In some embodiments, the protected area may be air-gapped, such that data cannot be readily transferred into or out of the protected area except through specialized channels, such as secure transfer service 124. In some embodiments, the protected area 116 may comprise one or more resource(s). The resources may comprise, for instance, computation and storage resources utilized by applications and/or services implemented on various devices/hosts in the protected area 116. Deployment, maintenance, and use of these resources may be associated with different users, which may include internal users (e.g., users of the provider network that develop applications or services that the provider network 100 offers to external users) and external users (e.g., customers of the provider network that host their own solutions within the provider network 100). The resources may be associated with a particular user or account or may be generally accessible to multiple users and/or multiple accounts.

Because it is difficult to get data out of the protected area 116, log files and other protected data 128 generated by various services within the protected area may be inaccessible to engineers and other users who may use such data to perform maintenance, troubleshooting, and other tasks. However, the services operating in the protected area typically are the same or very similar to services running in the public area 114 of the provider network. As such, the log files and other data emitted by these services may also be similar. In accordance with various embodiments, a cluster mapping service 110A and 110B can be implemented in bother the public area and the protected area of the provider network. In the public area of the provider network, cluster mapping service 110A can include a cluster training manager 118 that receives training data 112 at numeral 1. This training data may include log files or other data emitted by various services within public area 114. In some embodiments, the training data 112 may be selected from data emitted by only those services that are also implemented in protected area 116. Cluster training manager 118 can train a model, such as a K-means cluster model or other cluster model using the training data. At numeral 2, the cluster training manager 118 can output one or more cluster centroids/medoids 122 to data regeneration service 102 and, at numeral 3, can output the trained cluster model 120 to cluster mapping service 110B in the protected area. Cluster centroids may correspond to the theoretical center of each cluster. In some embodiments, if no data item from the training data corresponds to the cluster centroid, then one may be synthetically generated. Alternatively, cluster medoids may correspond to the closest member of the dataset to the cluster centroid. If no data item from the training data corresponds to the cluster centroid, then the cluster medoid may be used. In some embodiments, the cluster model provided by cluster training manager 118 can include a complete cluster model and its associated parameters. In some embodiments, the cluster model 120 can include the cluster centroids or medoids identified by the cluster training manager. The cluster model can be sent to the protected area using secure transfer service, as discussed below with respect to at least FIGS. 7 and 8.

In various embodiments, data item analysis may be event driven. For example, upon detection of a fault with a service in the protected area, data items associated with that service may be analyzed and the results exported to the unprotected area for use in troubleshooting, resource management, etc. In some embodiments, such an event may be a request received from a user, service, or other entity. For example, at numerals 4A-4C, a request for protected data can be received. In some embodiments, this request may originate from a user external to the provider network 100, such as using electronic device 104 and client 106 (e.g., an app, an application programming interface, a console, etc.), as shown at numeral 4A. In some embodiments, the request may originate from a user or service internal to the provider network, such as from service 130 and client 132 within the public area of the provider network, as shown at numeral 4B, or from service 134 and client 136 in the protected area of the provider network, as shown at numeral 4C. In some embodiments, the request may identify one or more data items to be analyzed. The data item(s) may be identified by the service that created them and/or by a time period in which they were created. In some embodiments, the data item(s) may be identified based on an identifier associated with the data item(s), such as an event identifier that was created when an event was detected, and the data item(s) were created. In some embodiments, the request may additionally, or alternatively, identify one or more storage locations in which data item(s) to be analyzed are stored. For example, a service may be onboarded to the cluster mapping service by providing a storage location (in the public area for services in the public area or in the protected area for services in the protected area) to which data items to be analyzed by the cluster mapping service are to be stored.

In some embodiments, the request at 4A and 4B can be sent to data regeneration service 102. Data regeneration service 102 is responsible for obtaining information output by the cluster mapping service about the requested data items and providing and then regenerating a data item that represents the protected data item. At numeral 5, data regeneration service 102 can send the request to cluster mapping service 110B for information about the data item(s) indicated in the request. A cluster mapping manager 126 can coordinate obtaining the protected data items 128 identified based on the request, at numeral 6, and processing the protected data items through the cluster model 120 received from cluster mapping service 110A. As discussed, at numeral 6, the cluster mapping manager can obtain the protected data items from one or more storage locations in protected area 116. The storage locations may be identified based on the request. For example, the request may include a specific storage location(s) from which to obtain the protected data items. Alternatively, depending on the service(s) with which the data items are associated, the cluster mapping manager 126 may identify one or more associated storage locations that were defined during an onboarding process. Additionally, or alternatively, the protected data items stored in the storage locations may be queried (e.g., using SQL statements or other query processing techniques) to identify at least a subset of the protected data items 128 for processing. For example, the request may include a query that defined a date range, identifier range, or other operation or predicate to effectively filter at least a portion of the protected data items for processing by the cluster mapping service.

At numeral 7, the protected data items obtained by the cluster mapping manager 126 based on the request can be provided to the cluster model 120 obtained from the cluster mapping service 110A in the public area of the provider network. Each data item can be analyzed by the cluster model 120 and assigned a cluster identifier (ID) and a confidence score. The cluster ID and confidence score for each data item can be returned to the cluster mapping manager. At numeral 8, the cluster ID and confidence score associated with each protected data item can be returned to the data regeneration manager 125 of data regeneration service 102. By reducing each protected data item to a cluster ID and a confidence score, any possible protected content is removed. As a result, this information can be passed through the secure transfer service 124 from the protected area to the public area. At numeral 9, for each data item, data regeneration manager 125 can identify the cluster centroid or medoid 122 associated with the cluster ID received from the cluster mapping service 110B and create a corresponding regenerated data item 134 using the cluster centroid or medoid, at numeral 10. In some embodiments, depending on the confidence score, the data item may not be regenerated, or the regenerated data item may be associated with a visual representation that indicates the confidence score. For example, a confidence score below a first threshold may cause data regeneration manager 124 to indicate that the data item could not be regenerated, a confidence score between the first threshold and second threshold may cause the data regeneration manager to add a visual indicator (such as a change in color of the data item) to indicate a lower confidence regeneration, and a confidence score greater than the second threshold may cause the data regeneration manager to make no changes to the visual appearance of the regenerated data item. In some embodiments, the regenerated data item may include the confidence score as a field in the regenerated data item.

In some embodiments, when data items are added to the storage location, a serverless function may be triggered which takes the data items and sends them to an endpoint associated with a machine learning service that hosts the cluster model. In some embodiments, this machine learning service may be part of cluster mapping service 110B or may be a separate service that hosts the cluster model. Likewise, when a new cluster model is sent through the secure transfer service 124, a serverless function may be triggered which adds the new cluster model to the endpoint of the machine learning service.

The regenerated data 134 can be returned to the requestor for further use, such as troubleshooting, resource management etc. This may include returning the regenerated data to the client 106 or 132 that requested the data. In some embodiments, client 136 may indicate in its request a different client in the public area of provider network 100 or external to provider network 100 which is to receive the regenerated data. Additionally, or alternatively, the client 136 may indicate a storage location in the public area of the provider network in which regenerated data 134 is to be stored.

In some embodiments, the confidence scores may be used to determine that the cluster model's performance has degraded (e.g., due to a change in data item formatting as a result of a service upgrade, or other changes that impact the ability of the cluster model to accurately identify clusters). If the confidence scores for one or more clusters collected over time are trending negatively (e.g., confidence scores are going down over time), then the model can be retrained or optimized using new data from the public area of the provider network. The resulting new model can then be sent to the protected area for use going forward.

In some embodiments, if confidence scores are below a threshold value, but overall confidence scores have not been trending negatively, then this may indicate that an unknown type of data item has been identified. In such cases, a request can be sent to a cleared engineer who can access the data items in the protected area for additional information about the unknown data item. In some embodiments, per-cluster confidence scores can be tracked over time. If confidence scores for only a particular cluster trend negatively then additional training may be performed using corresponding data items from the public area of the provider network.

In some embodiments, rather than exporting the cluster model to the protected area, a data item and cluster ID for each identified cluster in the public area can be exported. This mapping can be used as the seed for the clustering analysis performed in the protected area. This approach can provide additional insight into the model being used to engineers in the protected area. Rather than having the cluster model identify the cluster ID associated with each data item being analyzed, a distance from each data item to the received centroids or medoids can be computed. Based on the computed distances, a minimum distance to one of the centroids or medoids can be identified and a confidence score calculated based on the distances. The cluster ID corresponding to the closest centroid or medoid and the confidence score can then be returned.

Figure 2:
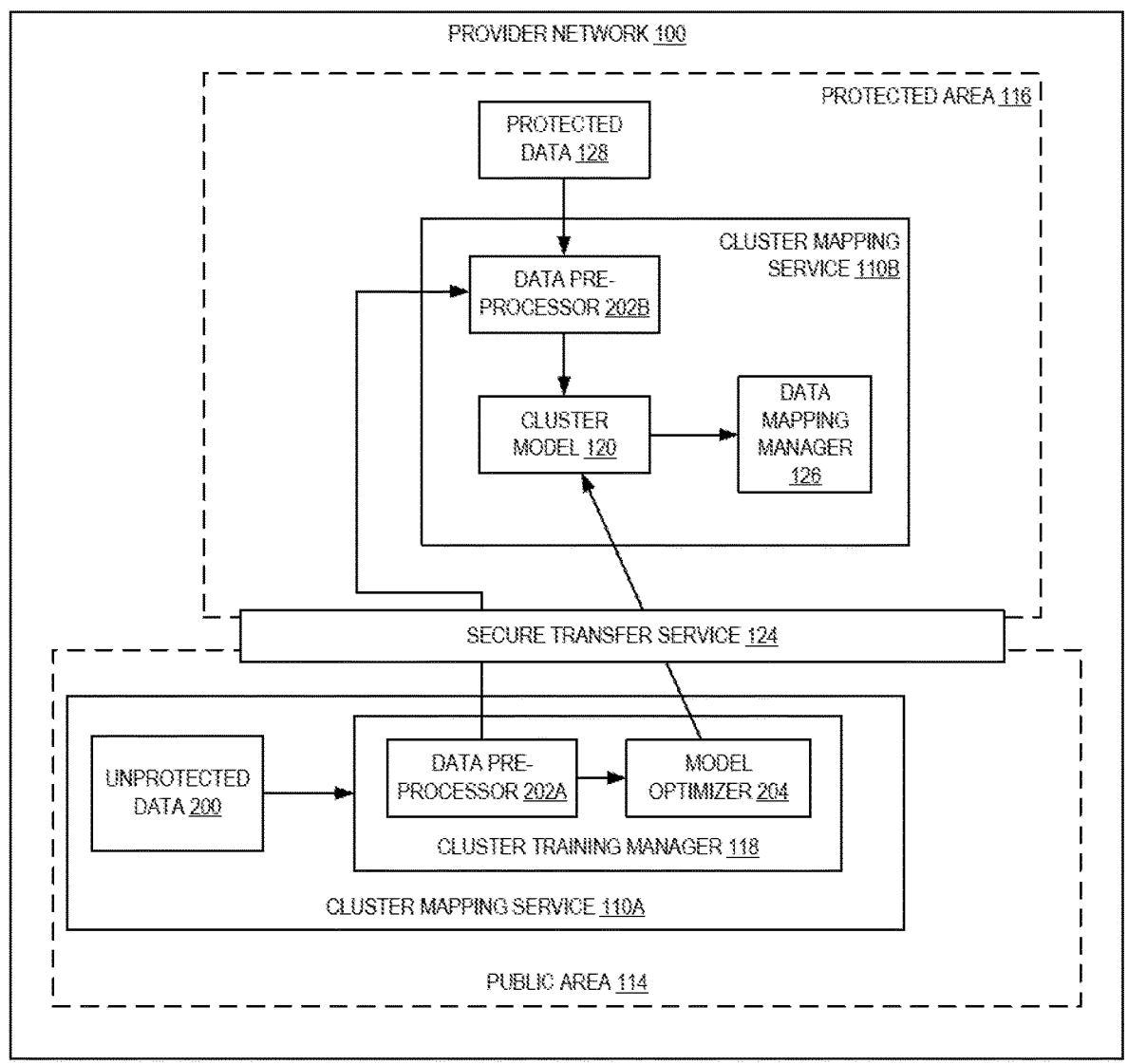
FIG. 2 is a diagram illustrating an environment for model optimization according to some embodiments.

FIG. 2 is a diagram illustrating an environment for model optimization according to some embodiments. As discussed, clustering techniques, such as K-means clustering or other techniques, may be used to identify clusters of different types of data items, such as logs, generated in a public area of the provider network. In some embodiments, the cluster mapping service 110A may include a cluster training manager 118. In some embodiments, cluster training manager can be a continually operating component that updates and optimizes the cluster model 120 based on unprotected data 200 that is available in the public area (e.g., logs generated by services hosted in the public area, or other data of interest available in the public area). The cluster training manager 118 may include a data pre-processor 202A and a model optimizer 204. In some embodiments, data preprocessor 202 may implement various preprocessing rules that are defined for a particular type of data item. For example, data items may include some fields that will vary from data item to data item but which may not be relevant for a clustering analysis. These may include fields that are fixed in a given region but which may vary across areas of the provider network, such as area identifiers. These may also include procedurally generated fields such as timestamps, or repeating values that may be specific to a particular host machine, network, or other resource, such as partition identifiers, etc. By replacing such fixed, repeating, or procedurally generated data with placeholder values, the data items may be clustered on portions of the data items that are most useful to the engineers who use the data items for troubleshooting etc. These same preprocessing rules can be passed to the cluster mapping service 110B to be implemented by data preprocessor 202B. When protected data 128 is to be analyzed using the cluster model 120, it can first be preprocessed using the same preprocessing rules. This results in more accurate cluster analysis being performed.

In some embodiments, placeholder values may also be used to identify configuration errors between areas of the provider network. As discussed, when a data item is regenerated, the placeholder identifiers may be replaced with placeholder values obtained from a placeholder dictionary. Different areas of the provider network may be associated with different configuration data. If configuration data for area A has been applied to a resource in area B, this may lead to errors. When log files, or other data items, are generated due to one of those errors, the area identifiers can be inspected to determine whether the correct area identifier is included in the log file. Such inspection may be performed manually or automatically as a check performed during regeneration by data regeneration manager 125. If the wrong area identifier is detected, a notification can be generated by the data regeneration manager indicating that the configuration file needs to be updated.

Figure 3:
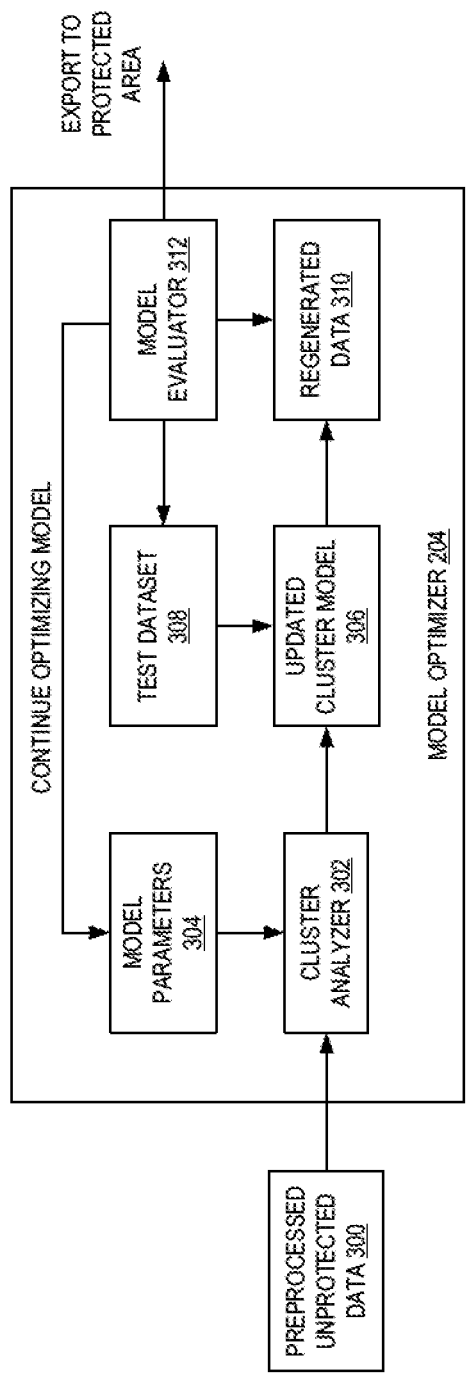
FIG. 3 is a diagram illustrating a model optimizer according to some embodiments.

FIG. 3 is a diagram illustrating a model optimizer according to some embodiments. In some embodiments, preprocessed unprotected data 300 can be provided to model optimizer 204 to optimize the cluster model in use. This may include training data, new data items that have been generated in the public area of the provider network, or other data on which to further optimize the cluster model. A cluster analyzer can implement a clustering technique (e.g., K-means clustering or other clustering technique) and output an updated cluster model 306 using the new data for training. The updated cluster model can be tested using a test dataset 308. The updated cluster model outputs regenerated data 310 corresponding to the test dataset. A model evaluator 312 can compare the regenerated data 310 to the test dataset 308 and determine whether the model has been improved. If the model has been improved, it can be exported to the protected area to be used in data analysis. If the model has not been improved, then model parameters 304 can be modified and model training can continue. In some embodiments, the model optimizer can continuously analyze preprocessed unprotected data, and develop a cluster model for mapping this data into one of N (e.g., a plurality) Clusters. In some embodiments, model evaluation may be performed manually by a user, using another machine learning service, or through a combination or manual and automated processes.

Figure 4:
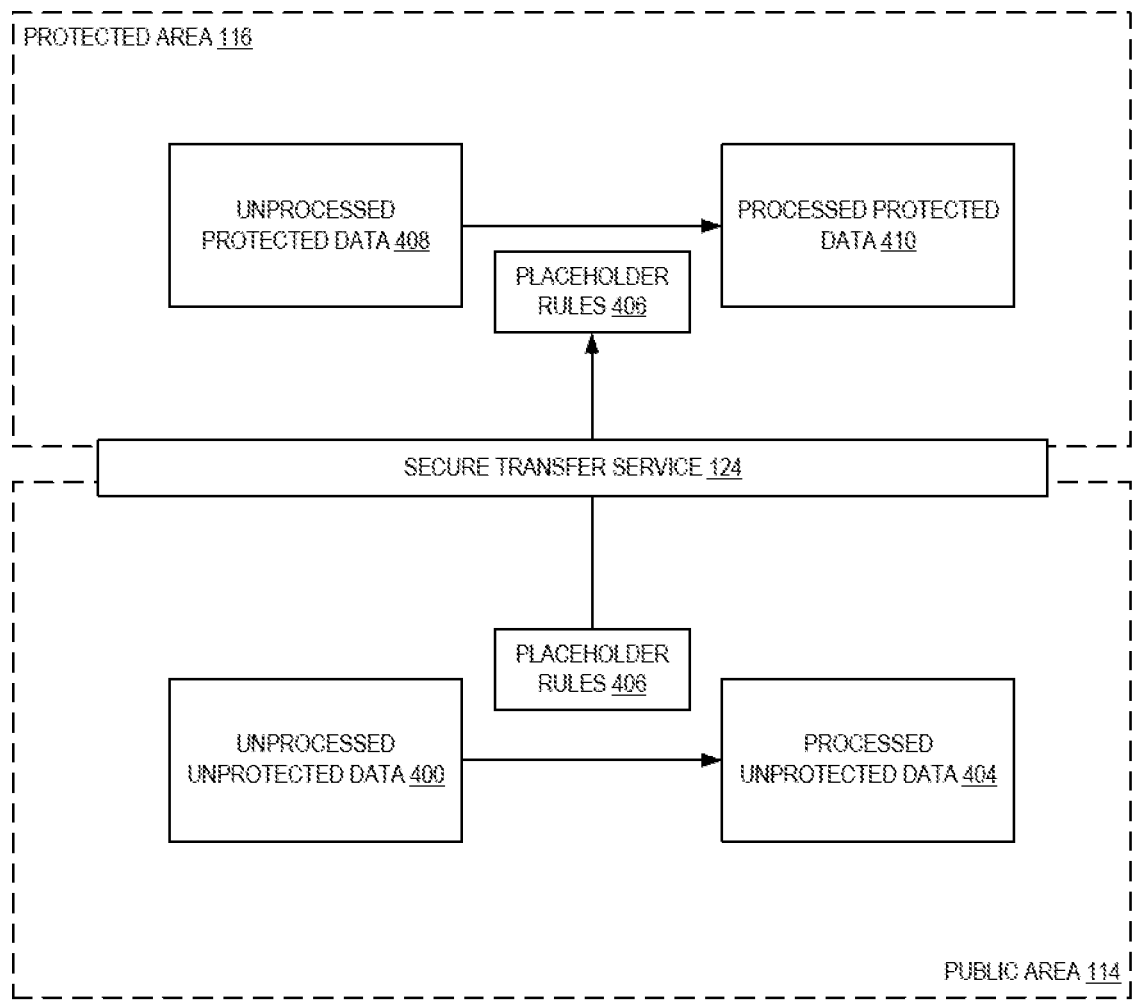
FIG. 4 is a diagram illustrating data preprocessing in protected and public areas of a provider network according to some embodiments.

FIG. 4 is a diagram illustrating data preprocessing in protected and public areas of a provider network according to some embodiments. As shown in FIG. 4, portions of the data items that are known to be varying or different between the protected data items and the unprotected data items can be replaced by placeholder values, rendering the cluster model more accurate. As discussed, preprocessing can be performed using placeholder rules. The placeholder rules can be defined by a user who manually reviews the unprotected data items 400 to identify fields, columns, or other portions of the data items which include information that is likely to vary, such as request IDs, region IDs, timestamps, etc. Because this information is known to vary, by replacing them with placeholder values, the cluster model can identify clusters based on information in the data items that is more useful for the task being performed, such as troubleshooting, resource management, etc. In some embodiments, automated techniques may be used to identify these portions. For example, machine learning techniques, principal component analysis, or other techniques may be used to identify timestamps, universally unique IDs (UUIDs), etc. and replace them with placeholders. Placeholder rules 406 can include the manual rules generated by a user and/or a machine learning model trained to identify and replace portions of the data items. Once the unprocessed unprotected data 400 has been preprocessed using the placeholder rules 406, processed unprotected data 404 is generated. This processed data can be used to train the cluster model discussed above.

Additionally, the placeholder rules can be passed through secure transfer service 124 to protected area 116. The placeholder rules 406 can then be used to preprocess unprocessed protected data 408 into processed protected data 410. This processed data can then be analyzed using the cluster model as discussed above. In some embodiments, the placeholder rules can include both what portions of the data to replace as well as a list of placeholder IDs. The placeholder IDs may be a dictionary that maps an identifier to a placeholder value, for example placeholder 1 may map to [Request ID] and placeholder 2 may map to [Datetime], etc.

In some embodiments, when the cluster IDs and confidence scores are returned for protected data items, the dictionary of placeholder IDs may also be returned. During data regeneration, the cluster ID can be replaced with the cluster centroid or medoid and any placeholder IDs can be replaced with their corresponding placeholder using the placeholder dictionary. In some embodiments, a copy of the placeholder dictionary can be maintained in the protected area and the public area, eliminating the need to include the dictionary with the cluster results. In some embodiment, when the dictionary is updated in the public area or the protected area, a new copy of the dictionary can be sent to the other area and used going forward for placeholder ID mapping.

In addition to preventing protected content from leaving a protected area, embodiments additionally provide significant data compression of the data items. As discussed, each data item can be reduced to an identifier and a confidence score to be regenerated later for further analysis. Although embodiments have been discussed with respect to preventing protected data from leaving a protected area, such as an air-gapped area of a provider network, embodiments may also be used in various environments in which access to sensitive data is to be restricted and where troubleshooting and other management tasks do not require the content of the sensitive data to be exposed.

Figure 5:
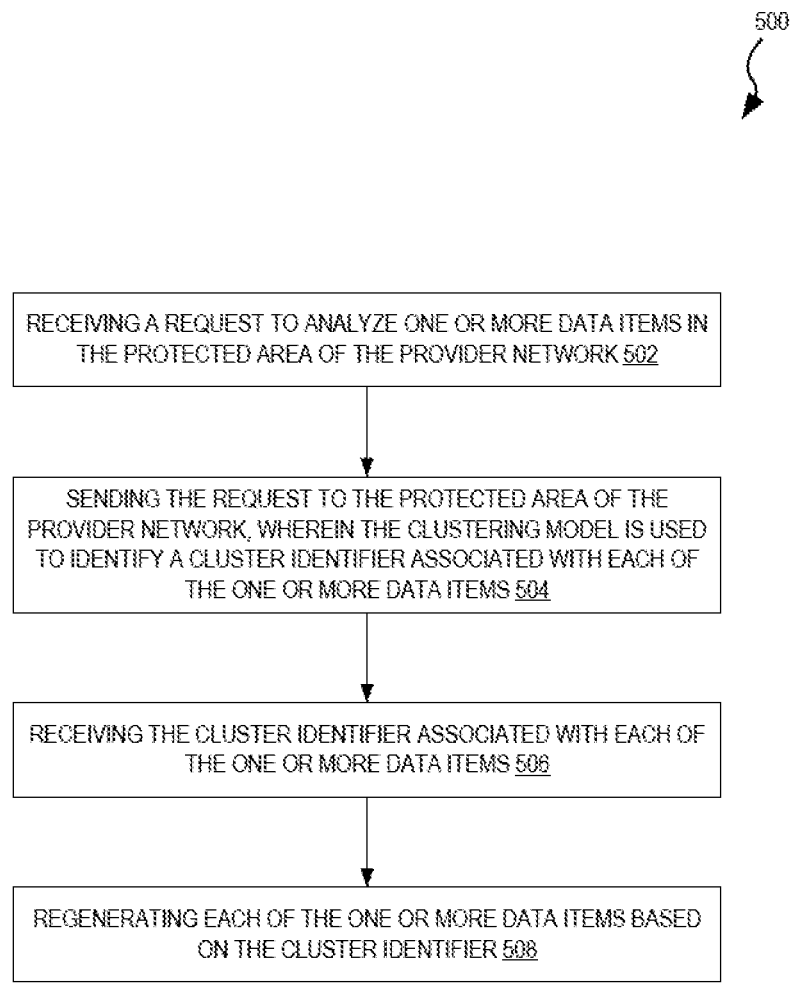
FIG. 5 is a flow diagram illustrating operations of a method for generating a data representation without access to content according to some embodiments.

FIG. 5 is a flow diagram illustrating operations 500 of a method for generating a data representation without access to content according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the data regeneration service 102 and/or the cluster mapping service 110A, 110B of the other figures.

The operations 500 include, at block 502, receiving a request to analyze one or more data items in a protected area of a provider network. In some embodiments, the operations may further comprise training a cluster model using a plurality of log files in an unsecured area of a provider network. In some embodiments, the operations may further comprise sending the cluster model to the protected area of the provider network using a secure transfer service. In some embodiments, the operations may further comprise sending a plurality of cluster centroids or medoids identified by the cluster model to the protected area of the provider network using a secure transfer service. In some embodiments, the secure transfer service comprises a first schema that restricts data that can be sent from a public area of the provider network to the protected area of the provider network, and a second schema that restricts data that can be sent from the protected area of the provider network to the public area of the provider network.

The operations 500 further include, at block 504, sending the request to the protected area of the provider network, wherein a cluster model is used to identify a cluster identifier associated with each of the one or more data items. In some embodiments, the operations may further include preprocessing the one or more data items in the protected area of the provider network before they are analyzed, wherein preprocessing includes replacing one or more of portions of the one or more data items with placeholder identifiers. In some embodiments, the placeholder identifiers indicate one or more of a region identifier, a request identifier, or a timestamp.

The operations 500 further include, at block 506, receiving the cluster identifier associated with each of the one or more data items. The operations 500 further include, at block 508, regenerating each of the one or more data items based on the cluster identifier. In some embodiments, regenerating each of the one or more data items based on the cluster identifier, may further comprise replacing the cluster identifier with a cluster centroid or medoid associated with the cluster identifier, and updating any placeholder identifiers with placeholder values using a placeholder dictionary. In some embodiments, the protected area of the provider network is an air-gapped area of the provider network.

In some embodiments, the operations 500 may comprise training a cluster model using a plurality of log files in a public area of a provider network, sending the cluster model to a protected area of the provider network using a secure transfer service, receiving a request to analyze a plurality of log files in the protected area of the provider network, sending the request to the protected area of the provider network, wherein a data analysis service uses the cluster model to identify a cluster identifier associated with each log file from the plurality of log files in the protected area, receiving the cluster identifier associated with each log file from the plurality of log files in the protected area using the secure transfer service, identifying a cluster centroid or medoid associated with each cluster identifier, and regenerating each log file from the plurality of log files in the protected area based on the cluster centroid or medoid.

Figure 6:
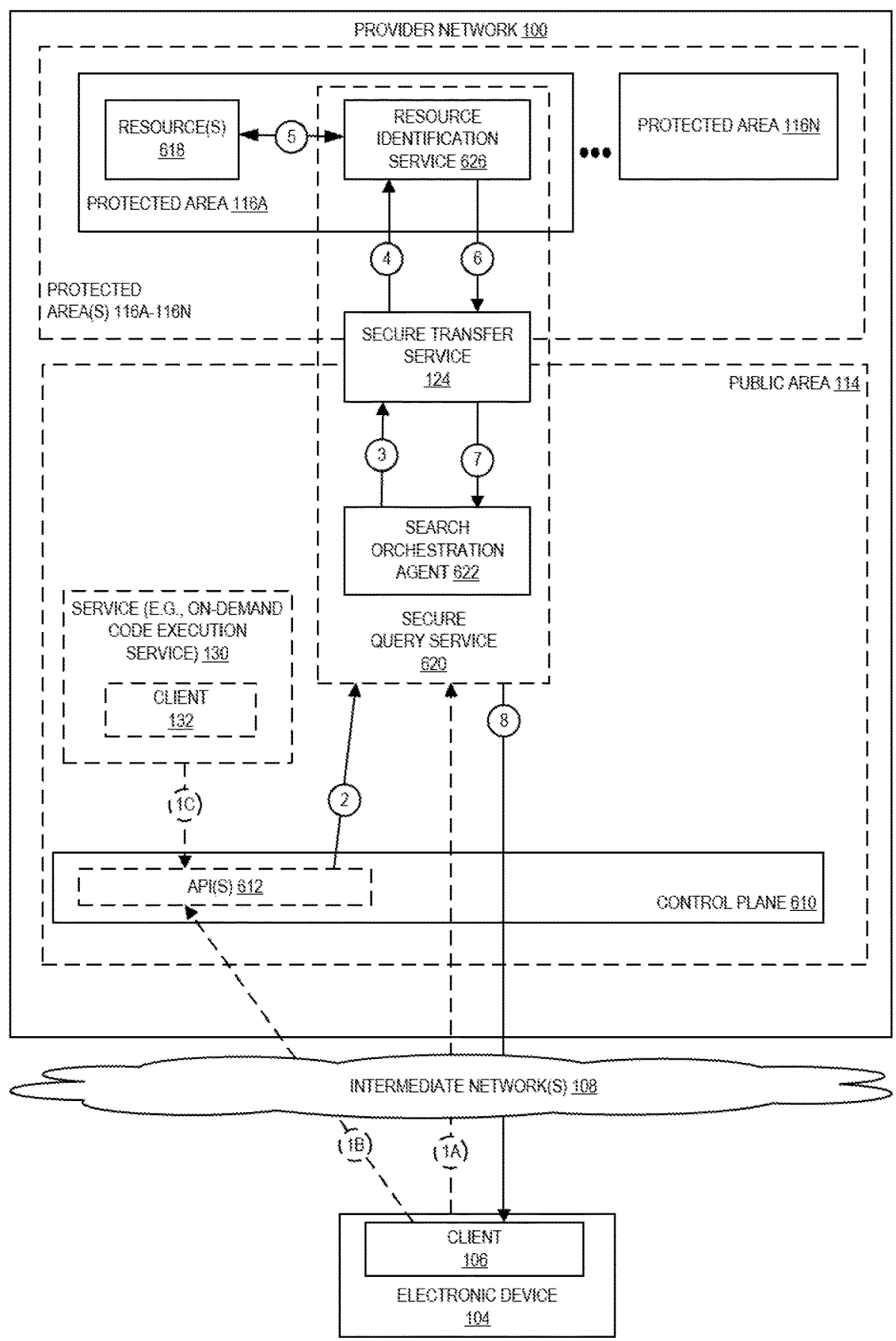
FIG. 6 is a diagram illustrating a framework for searching for resources in a protected area of a provider network, according to some embodiments.

FIG. 6 is a diagram illustrating a framework for searching for resources in an isolated area of a provider network, according to some embodiments. In some embodiments, the provider network 100 can be optionally subdivided into different areas. For example, as illustrated in FIG. 6, the provider network 100 may be subdivided into a public area 114 and one or more protected areas 116A-116N. Each area may be logically isolated from the other (and from any other areas not shown within provider network 100. For example, each area may be a distinct logical data center, supported by one or more physical data centers, and each area may have its own power supply and networking infrastructure to limit the likelihood of a failure in one area from affecting another area. In various embodiments provider network 100 may include a plurality of regions, each having its own plurality of areas. Each region of provider network 100 may include resources located in the same geographic area (e.g., state, country, etc.). By dividing provider network 100 into various regions and areas, the data and customer instances stored therein can be protected against failure events and access to different areas may be separately controlled.

In some embodiments, the public area 114 may be an area within the provider network that provides open access to, and interconnectivity among, a plurality of entities (users) of the provider network. The protected areas 116A-116N may be areas within a private area of the provider network and may be air-gapped from other areas of the provider network. Access to protected areas of the provider network, and interconnectivity between a protected area and other areas of the provider network (e.g., ability to receive data into and send data from the protected area) may be restricted to certain users of the provider network. In some embodiments, the protected areas 116A-116N may comprise one or more resource(s) 618. The resources 618 may comprise, for instance, computation and/or storage resources utilized by applications and/or services implemented on various devices/hosts in the protected areas 116A-116N. Because the protected areas of the provider network may include sensitive or otherwise protected information (e.g., information designated by a governmental or non-governmental entity as classified data or classified metadata), access to the protected areas may be restricted to users who have been cleared to view such protected information (e.g., cleared users). Deployment, maintenance, and use of these resources may be associated with different cleared users and uncleared users, which may include internal users (e.g., users of the provider network that develop applications or services that the provider network 100 offers to external users) and external users (e.g., customers of the provider network that host their own solutions within the provider network 100). The resources 618 may be associated with a particular user or account or may be generally accessible to multiple users and/or multiple accounts.

In some embodiments, the secure query service 620 provides uncleared users of the provider network 100 who do not have access to the one or more of the protected areas 116A-116N with the ability to request and/or query for information about the resources 618. As discussed, previously such uncleared users would have to request such information from cleared users. Because there are typically many fewer cleared users than uncleared users, this can be a time consuming process for the cleared users to respond to such requests. Additionally, it introduces the possibility of human error leading to incorrect or inaccurate information about the resources being relayed to the uncleared users, leading to further delays in deploying infrastructure, troubleshooting, or otherwise maintaining the protected areas of the provider network. The secure query service 620 may include various components, modules, or functionalities such as a search orchestration agent 622, a secure transfer service 124 and a resource identification service 626. The components may be implemented in hardware, software, or a combination of both and collectively used by the secure query service 620 for executing search queries against resources hosted in one or more protected areas 116A-116N of the provider network.

In some embodiments, the secure query service 620 and its components may be distributed across different areas (e.g., the public area 114 and the protected area(s) 116A-

116N) in the provider network. For instance, as shown in FIG. 6, the search orchestration agent 622 may be implemented in the public area 114 and used by the secure query service to obtain search requests (from users) for resources residing in the protected areas 116A-116N of the provider network. The resource identification service 626 may be implemented in the protected areas 116A-116N and used by the secure query service 620 to execute the search requests and provide search responses to the users. The secure transfer service 124 may include one or more components, modules, or functionalities that may be implemented in both the public area 114 and protected areas 116A-116N. In some embodiments, the secure query service 620 may utilize the secure transfer service 124 to process search requests for resources residing in the protected areas 116A-116N, cause the execution of the search requests against the resources and send search responses to the users.

In some embodiments, at numeral 1A, a search query request may be submitted to the secure query service 620 via a client application 106 of an electronic device 104. For example, a user may interact with a user interface (UI) in the client application 106 to submit the search query request. In some embodiments, the search query request may specify a request for information about a resource in a protected area (e.g., 116A) of the provider network for which the user is responsible for maintaining, troubleshooting, deploying, etc. (e.g., the user has an account associated with the resource). In some embodiments, the search query request may specify one or more search parameters. For instance, the search parameters may include an identifier (e g, name) of the resource and an identifier of a protected area (e.g., 116A) where the resource is located. For example, a search query request for information about a database instance (e.g., a database table in the database instance) in a protected area 116A may specify an identifier associated with the database table and an identifier of the protected area 116A where the database table is located. The database table may be associated with the user's account and may include permissions indicating the ways in which the user may access and/or query information about the database table. In some embodiments, the user may first be authenticated using an authentication service in the provider network which authenticates the user making the search request prior to submitting the search request to the secure query service 620. For instance, the authentication service 128 may authenticate the user based on data provided by the user (e.g., credentials, encrypted material, etc.).

Alternatively, in some embodiments, at numeral 1B, a search query request may be submitted by the user via an Application Programing Interface (API) call to an API 612 in a control plane 610 in the provider network 100. For instance, the user may submit the API call via the client application 106 of the electronic device 104 which may potentially occur responsive to a user interacting with the client application 106. For example, the user may interact with a UI in the client application 106 to submit an API request. Alternatively, in some embodiments, the client application may directly issue the search query request (e.g., as an API request) as part of a script or program without user interaction. The search query request may be received via one or more APIs 612 in the control plane 610 which may then transmit the search query request to the secure query service 620. The control plane 610 may handle many of the tasks involved in accepting and processing requests from users, including traffic management, authorization and access control, monitoring, and API management. For example, in some embodiments the control plane 610 creates, publishes, maintains, and monitors various APIs for users to access and interact with services of the provider network 100. In some embodiments, as shown at numeral 1C, the search request may also originate from another client application 632 implemented within another service 630 in the provider network such as an on-demand code execution service, a hardware virtualization service, or another service implemented by the provider network.

Secure query service 620 can receive the search query request (e.g., directly via client application 106 as shown at numeral 1A, or via API 612 at numeral 2). The search query request may be received by the search orchestration agent 622 in the secure query service 620. As discussed further below, the search orchestration agent 622 can store a record of the search and pass the search, at numeral 3, to secure transfer service 124. As shown in FIG. 6, secure transfer service 124 may be implemented across the public area and the protected area of the provider network. For example, the secure transfer service 124 may include a first storage location hosted in the public area in which the search query request may be stored. The secure transfer service can verify the search query request (e.g., apply a first schema provided by the protected area to the search query request) before passing the search query request to a second storage location hosted in the destination protected area 116A. Once the search query request has been added to the second storage location, at numeral 4, an event can be generated and sent to resource identification service 626. Resource identification service 626 may then perform the query on resources 618, as shown at numeral 5. The resource identification service may then generate a response based on the query results. At numeral 6, the resource identification service 626 can add the response to the second storage location of secure transfer service 124. The response can be verified using a second schema provided by the protected area 116A to ensure the response includes only data that is allowed to be sent from the protected area to a public area. Once the response is verified, it can be added to the first storage location of the secure transfer service 124. This may trigger an event, at numeral 7, to search orchestration agent 622 indicating that a response has been added to the first storage location. Search orchestration agent 622 can obtain the response from the first storage location and provide the response to the client application 106 (e.g., via a notification, email, or other communication) at numeral 8.

Figure 7:
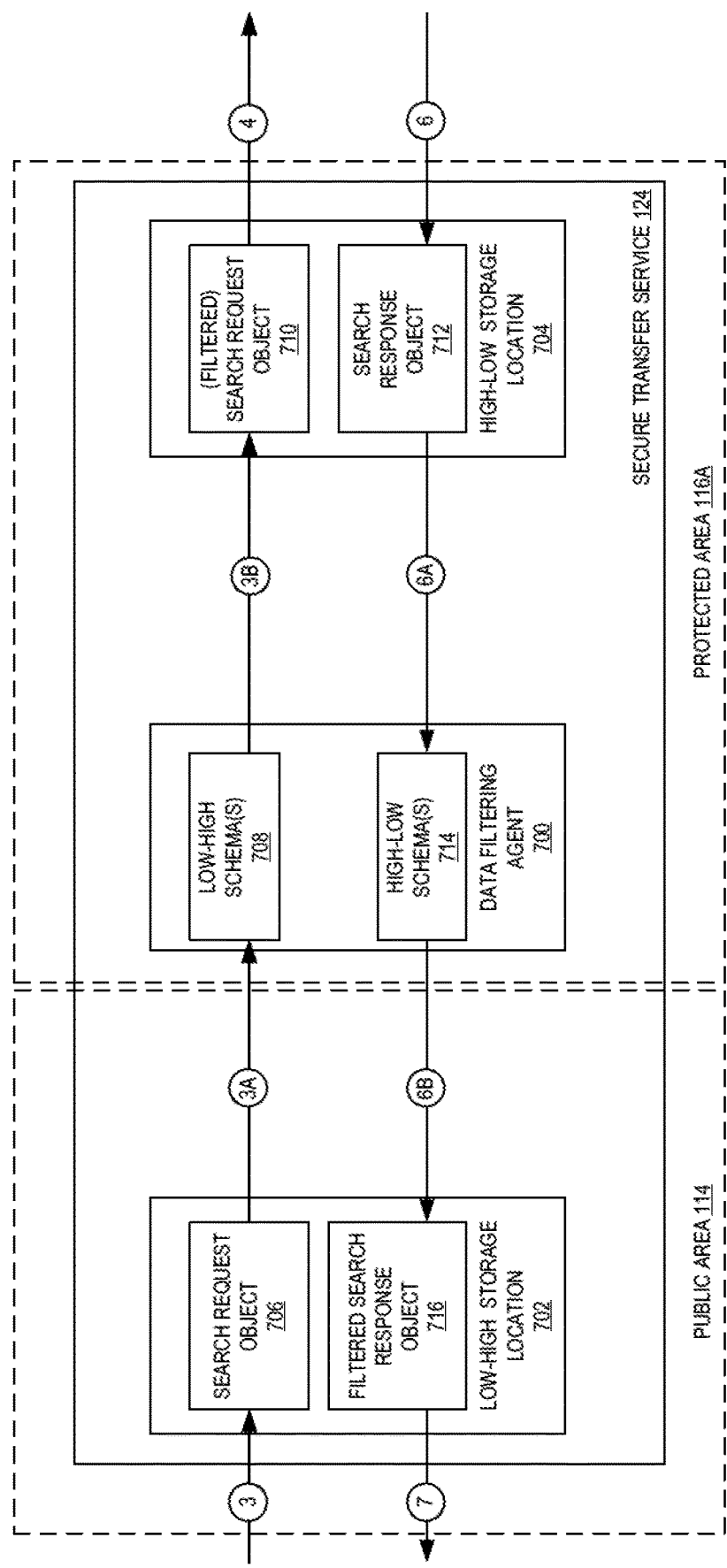
FIG. 7 is a diagram illustrating exemplary operations performed by one or more components of the secure transfer service for processing a search query request and a search query response, according to some embodiments.

FIG. 7 is a diagram illustrating exemplary operations performed by one or more components of the secure transfer service 124 for processing a search query request accessible in a protected area (e.g., 116A) of the provider network and obtaining a search query response as a result of executing the search query request according to some embodiments. Referring to FIG. 7, in some embodiments, the secure transfer service 124 comprises a data filtering agent 700, a low-high storage location 702 and a high-low storage location 704. In some embodiments, the low-high storage location 702 and the high-low storage location 704 may be implemented as part of a storage service provided by the provider network. In some embodiments, and as will be described in detail below, the storage service may provide object-based storage that may be used by the secure transfer service 124 to process a search query request for a resource and obtain a search query response as a result of execution of the search request.

In some embodiments, the low-high storage location 702 (e.g., a first storage location) may be implemented in the public area 114 of the provider network and the high-low storage location (e.g., a second storage location) may be implemented in the protected area 116A of the provider network. In some embodiments, as discussed above with respect to FIG. 6, at numeral 7, the secure transfer service 124 receives the search query request from the search orchestration agent 622 and stores the search query request in the low-high storage location 702. In some embodiments, a representation of the search query request may be stored as, e.g., an object, record, or file in the low-high storage location 702 and referenced by a URL (Uniform Resource Locator).

At numeral 7A, the data filtering agent 700 may access the low-high storage location 702 (e.g., programmatically or via an API call) and retrieve the search request object 706 from the low-high storage location 702. For example, the data filtering agent 700 may be configured to use the URL referencing the search request object 706 to retrieve the object from the low-high storage location 702. In some embodiments, the data filtering agent 700 may determine that there is a search request object 706 stored in the low-high storage location 702 by periodically polling the low-high storage location 702. In other examples, the data filtering agent 700 may subscribe to a monitoring service in the provider network that may inform the low-high storage location 702 of the existence of a search request object 706. As shown in FIG. 7, the data filtering agent 700 can be hosted in protected area 116A and managed by the protected area. For example, the schemas implemented by the data filtering agent 700 may be controlled by the protected area, to ensure that the security standards required by the protected area are implemented in the schemas.

In some embodiments, the data filtering agent 700 may perform checks on the search request object 706 before the search request object is sent to the high-low storage location 704 in protected area 116A. For instance, in some embodiments, the data filtering agent 700 may identify a low-high schema 708 to be applied to the search request object to verify the search request object (e.g., to determine whether the search request object includes any prohibited data, as defined in the low-high schema). For example, the low-high schema 708 may analyze the search request object 706 to filter out executable file types, such as binaries, from the search request object and allow free form strings, integers, or text fields in metadata associated with the search request object 706. If any prohibited data is identified in the search request object, the search may fail and a response indicating such can be returned. Alternatively, in some embodiments, the prohibited data may be removed from the search request object, and the resulting filtered search request object can be used to perform the search.

Upon verification of the search request object, at numeral 7B, the data filtering agent 700 may generate a filtered search request object 710 and transmit the filtered search request object 710 to the high-low storage location 704 associated with the secure transfer service 124. In some embodiments, the high-low storage location 704 may be located in the protected area 116A of the provider network 100. In some embodiments, the storage of the filtered search request object 710 may trigger an event which may in turn cause the high-low storage location 704 to publish a message to the search gatherer service 626 of the existence of the filtered search request object 710 in the high-low storage location 704.

As discussed above, secure transfer service 124 may also manage the return of a search query response to the requestor. In some embodiments, at numeral 6, a representation of the search query response is stored as a search response object 712 in the high-low storage location 704. For example, as discussed above with respect to FIG. 6, the resource identification service 626 can perform the search request query, generate a search request response, and return a representation of the search request response (e.g., an object, record, file, etc.). At numeral 6A, the data filtering agent is notified that a search result is in the second storage location and accesses the second storage location (e.g., programmatically or via an API call). The data filtering agent 700 then identifies a second schema to be applied to one or more attributes, and/or types of attributes of the search response object. In some embodiments, the second schema identifies a type of each of one or more attributes of the search response object 712 and comprises one or more validation rules indicating at least one expected characteristic of values of the attributes of the search response object. For example, the second schema may define particular types of metadata (e.g., specific attributes about one or more of the types of resources which may be included in the protected area) that are allowed to be included in the search response object. Additionally, or alternatively, the second schema may define prohibited types of metadata that are not allowed to be included in the search response object. Further, the second schema may define validation rules which may specify one or more threshold values that the metadata values must not be larger than, smaller than, etc. The rule may specify that values of the attribute must be within a set of defined values. The rule may specify that values of the attribute must be larger than, equal to, and/or smaller than some other value that can be derived (e.g., dynamically, or periodically) based on other data. At numeral 6B, the data filtering agent publishes an event to the first storage location to store the search result which includes metadata about the resource. If any prohibited information (e.g., based on the type of information or the value of the information included in the response object) is identified in the search response object, the search may fail and a response indicating such can be returned. Alternatively, in some embodiments, the prohibited information may be removed from the search response object, and the resulting filtered search response object can be returned. At numeral 7, the search response is returned to the search orchestration agent 622, and the search query response is returned to the requestor as discussed above.

Figure 8:
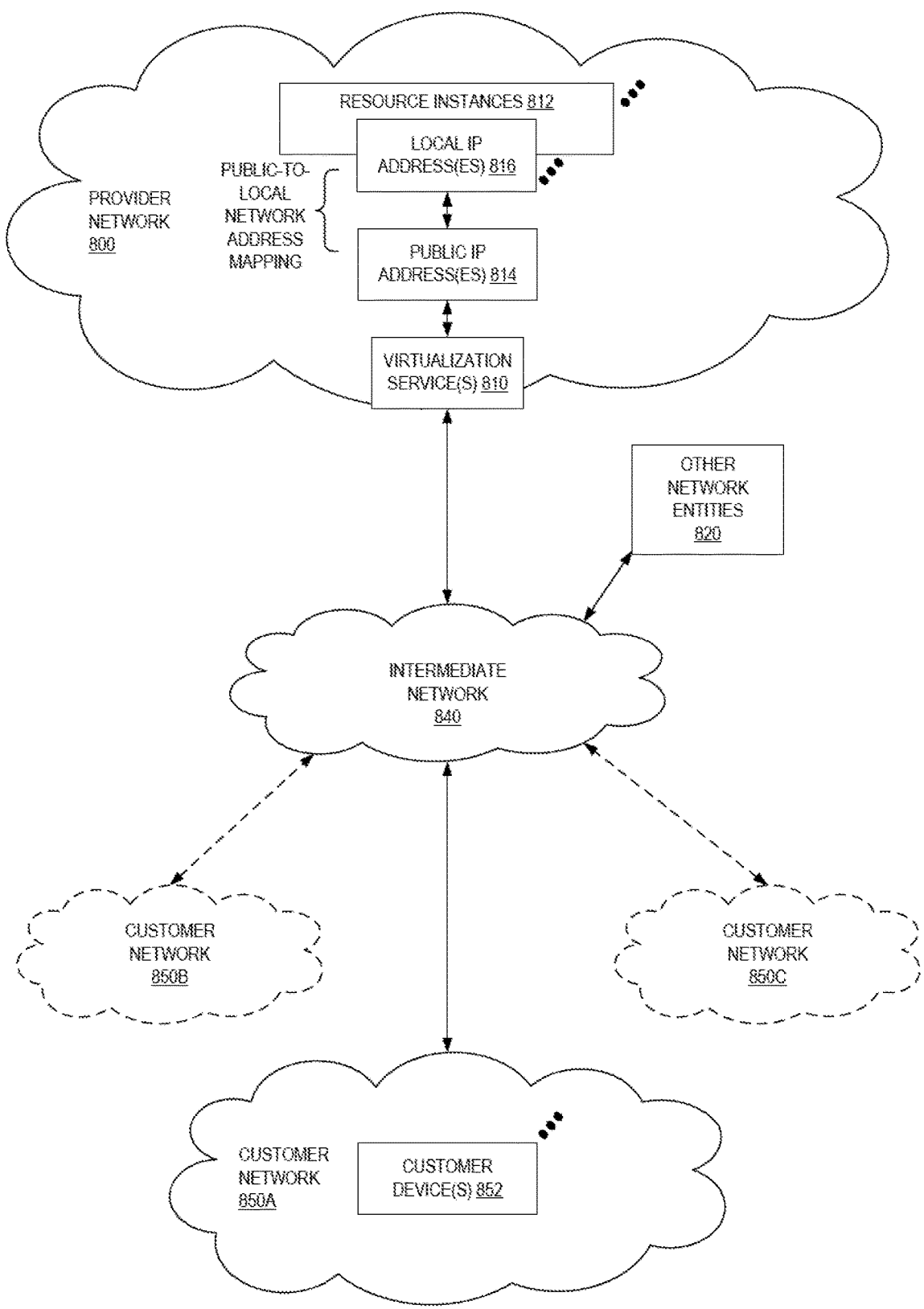
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer.

The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
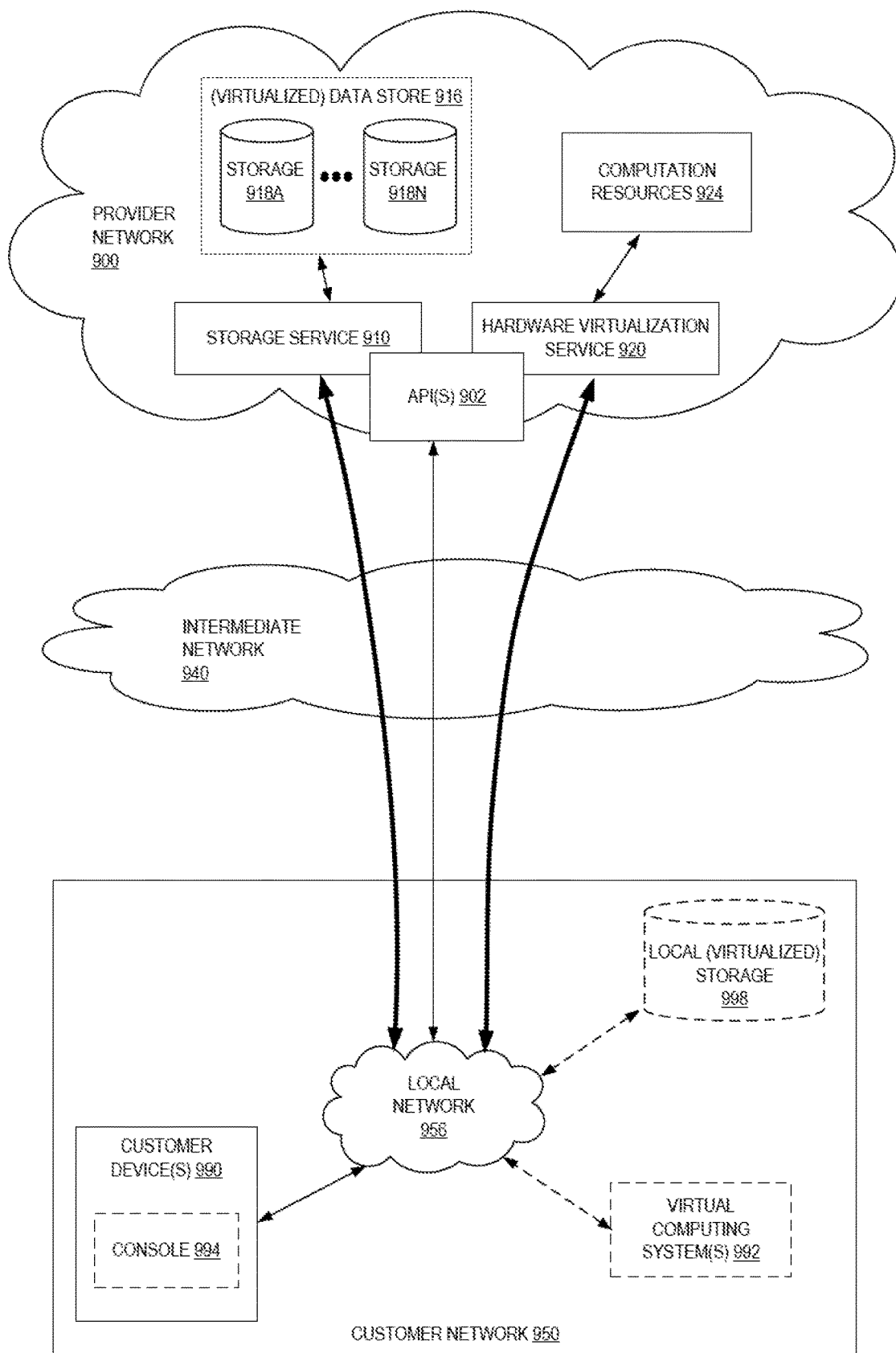
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
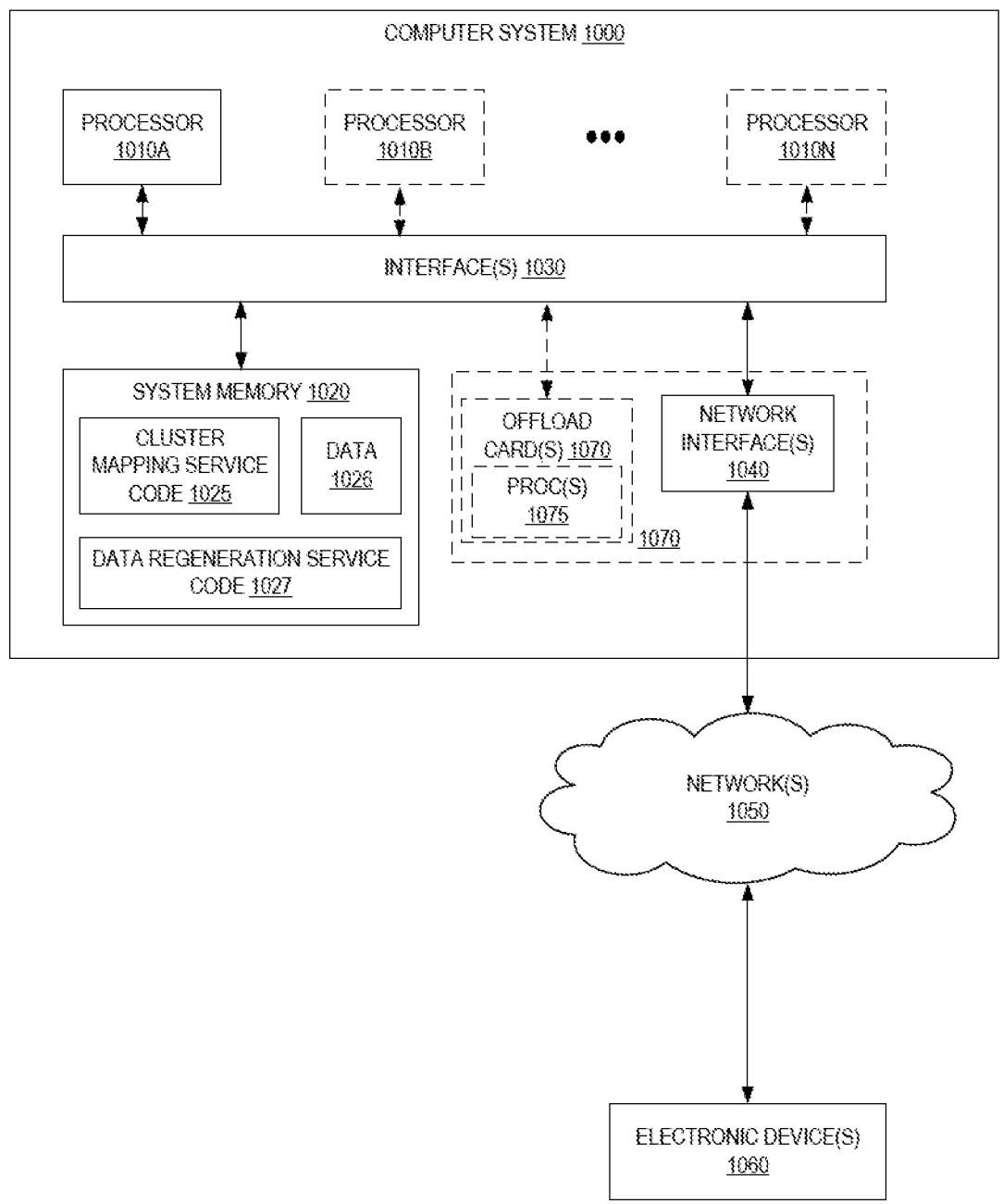
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as cluster mapping service code 1025, data regeneration service code 1027, and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   training a cluster model using a plurality of log files in a public area of a provider network;
   sending the cluster model to a protected area of the provider network using a secure transfer service;
   receiving a request to analyze a plurality of log files in the protected area of the provider network, the request being received at the public area of the provider network;
   sending the request to the protected area of the provider network, wherein a data analysis service uses the cluster model in the protected area to identify a cluster identifier associated with each log file from the plurality of log files in the protected area;
   receiving the cluster identifier associated with each log file from the plurality of log files in the protected area using the secure transfer service;
   identifying a cluster centroid or medoid associated with each cluster identifier; and
   generating a data representation of each log file from the plurality of log files in the protected area based on the cluster centroid or medoid associated with the cluster identifier associated with each log file.

2. The computer-implemented method of claim 1, wherein generating a data representation of each log file from the plurality of log files in the protected area based on the cluster centroid or medoid, further comprises:
   for each cluster identifier received, replacing each cluster identifier with its corresponding cluster centroid or medoid; and
   mapping placeholder identifiers to placeholder values using a placeholder dictionary.

3. The computer-implemented method of claim 1, wherein the secure transfer service comprises a first schema that restricts data that can be sent from the public area of the provider network to the protected area of the provider network, and a second schema that restricts data that can be sent from the protected area of the provider network to the public area of the provider network.

4. A computer-implemented method comprising:
   training a cluster model using a first set of one or more data items;
   receiving a request to analyze a second set of one or more data items in a protected area of a provider network, the request being received at a first area of the provider network that is not the protected area of the provider network;
   sending the request to the protected area of the provider network, wherein the cluster model is used in the protected area to identify a cluster identifier associated with each data item of the second set of one or more data items;
   receiving the cluster identifier associated with each data item of the second set of one or more data items;
   identifying a cluster centroid or medoid associated with each cluster identifier; and
   generating a data representation of each data item of the second set of one or more data items based on the cluster centroid or medoid associated with each of the one or more data items.

5. The computer-implemented method of claim 4, further comprising:
   preprocessing the second set of one or more data items in the protected area of the provider network before they are analyzed, wherein preprocessing includes replacing one or more of portions of the second set of one or more data items with placeholder identifiers.

6. The computer-implemented method of claim 5, wherein the placeholder identifiers a fixed, repeating, or procedurally generated value.

7. The computer-implemented method of claim 6, wherein generating a data representation of each of the second set of one or more data items based on the cluster identifier associated with each of the second set of one or more data items, further comprises:
   replacing the cluster identifier with the cluster centroid or medoid associated with the cluster identifier; and
   updating any placeholder identifiers with placeholder values using a placeholder dictionary.

8. The computer-implemented method of claim 7, further comprising:
   identifying a configuration error in the protected area based on at least one placeholder value in at least one regenerated data item.

9. The computer-implemented method of claim 7, further comprising:
   sending the cluster model to the protected area of the provider network using a secure transfer service.

10. The computer-implemented method of claim 4, further comprising:
    sending a plurality of cluster centroids or medoids identified by the cluster model to the protected area of the provider network using a secure transfer service.

11. The computer-implemented method of claim 9, wherein the secure transfer service comprises a first schema that restricts data that can be sent from a public area of the provider network to the protected area of the provider network, and a second schema that restricts data that can be sent from the protected area of the provider network to the public area of the provider network.

12. The computer-implemented method of claim 4, wherein the protected area of the provider network is an air-gapped area of the provider network.

13. A system comprising:
    a first one or more electronic devices to implement a cluster mapping service; and
    a second one or more electronic devices to implement a data regeneration service, the data regeneration service including instructions that upon execution cause the data regeneration service to:
    train a cluster model using a first set of one or more data items;
    receive a request at a first area of a provider network to analyze a second set of one or more data items in a protected area of the provider network, wherein the protected area of the provider network is an air-gapped area of the provider network with respect to the first area of the provider network;

send the request to the protected area of the provider network, wherein the cluster model is used in the protected area to identify a cluster identifier associated with each data item of the second set of one or more data items;

receive the cluster identifier associated with each data item of the second set of one or more data items;

identify a cluster centroid or medoid associated with each cluster identifier; and generate a data representation of each data item of the second set of one or more data items based on the cluster centroid or medoid associated with each data item of the second set of one or more data items.

14. The system of claim 13, wherein the cluster mapping service includes instructions that upon execution cause the cluster mapping service to:

preprocess the one or more data items in the protected area of the provider network before they are analyzed, wherein preprocessing includes replacing one or more of portions of the second set of one or more data items with placeholder identifiers.

15. The system of claim 14, wherein the placeholder values indicate one or more of a region identifier, a request identifier, or a timestamp.

16. The system of claim 13, wherein the cluster mapping service includes instructions that upon execution cause the cluster mapping service to:

train a cluster model using a plurality of log files in an unsecured area of a provider network.

17. The system of claim 16, wherein the cluster mapping service includes instructions that upon execution further cause the cluster mapping service to:

send the cluster model to the protected area of the provider network using a secure transfer service.

18. The system of claim 16, wherein the cluster mapping service includes instructions that upon execution further cause the cluster mapping service to:

sending a plurality of cluster centroids or medoids identified by the cluster model to the protected area of the provider network using a secure transfer service.

19. The system of claim 18, wherein the secure transfer service comprises a first schema that restricts data that can be sent from a public area of the provider network to the protected area of the provider network, and a second schema that restricts data that can be sent from the protected area of the provider network to the public area of the provider network.

20. The system of claim 13, wherein the instructions to generate a data representation of each of the second set of one or more data items based on the cluster identifier associated with each of the second set of one or more data items, when executed further cause the data regeneration service to:

replace the cluster identifier with the cluster centroid or medoid associated with the cluster identifier; and update any placeholder identifiers with placeholder values using a placeholder dictionary.

* * * * *